(12) United States Patent
Crochet, Sr. et al.

(10) Patent No.: US 8,702,056 B2
(45) Date of Patent: Apr. 22, 2014

(54) PLUG VALVE AND STEM SEALING ASSEMBLY

(75) Inventors: Kevin W. Crochet, Sr., Baton Rouge, LA (US); Norman Eger, Baton Rouge, LA (US); Sideny A. Rovira, III, St. Amant, LA (US)

(73) Assignee: Aegis Flow Technolofies, L.L.C., Geismar, LA (US)

( * ) Notice: Subject to any disclaimer, the term of this patent is extended or adjusted under 35 U.S.C. 154(b) by 39 days.

(21) Appl. No.: 13/446,012

(22) Filed: Apr. 13, 2012

(65) Prior Publication Data

US 2013/0270472 A1   Oct. 17, 2013

(51) Int. Cl.
  *F16K 41/04* (2006.01)
(52) U.S. Cl.
  USPC .......................... 251/214; 251/309; 277/522
(58) Field of Classification Search
  USPC .......................... 251/214, 309–312; 277/522
  See application file for complete search history.

(56) References Cited

U.S. PATENT DOCUMENTS

| | | | |
|---|---|---|---|
| 3,192,942 A | | 7/1965 | Manor et al. |
| 4,535,803 A | * | 8/1985 | Price .............................. 251/312 |
| 4,759,530 A | * | 7/1988 | Iff .................................. 251/214 |
| 4,911,408 A | * | 3/1990 | Kemp ........................... 251/214 |
| 4,972,867 A | * | 11/1990 | Ruesch .......................... 251/214 |
| 5,064,167 A | * | 11/1991 | DiPalma ....................... 277/522 |
| 5,129,625 A | * | 7/1992 | Wood et al. .................... 277/522 |
| 5,263,682 A | * | 11/1993 | Covert et al. ................. 251/214 |
| 5,593,166 A | * | 1/1997 | Lovell et al. ................... 277/522 |
| 5,799,928 A | | 9/1998 | Siver |
| 5,927,685 A | * | 7/1999 | Gosling ........................ 251/214 |
| 6,027,098 A | | 2/2000 | Nevrekar |
| 6,095,493 A | * | 8/2000 | Velan ............................ 251/214 |
| 6,202,668 B1 | * | 3/2001 | Maki ............................. 251/214 |
| 2001/0020771 A1 | | 9/2001 | Nishikawa |
| 2002/0036279 A1 | | 3/2002 | Chatufale |

FOREIGN PATENT DOCUMENTS

DE    8525834 U1    12/1985

OTHER PUBLICATIONS

Xomox Corporation. (1998). Tufline Lined Plug Valves. Cincinnati, Ohio.

\* cited by examiner

*Primary Examiner* — John Bastianelli
(74) *Attorney, Agent, or Firm* — Roy Kiesel Ford Doody & Thurmon APLO

(57) ABSTRACT

A plug valve and stem sealing assembly capable of preventing leakage under demanding environmental and operating conditions while also improving the reliability of the valve seal. The valve includes a body, a flow-element, a bonnet and a self-adjusting stem sealing assembly. The body has a first port and a second port with a passage configured to flow a media extending between the first port and the second port. The flow-element is positioned between the first and second port and has a stem configured to actuate the flow-element between a closed position and an open position. The bonnet may be secured to the valve body and configured to secure the flow-element and stem sealing assembly in position. The self-adjusting stem sealing assembly is positioned adjacent to the stem and is configured to prevent media leakage from the valve.

20 Claims, 6 Drawing Sheets

PLUG VALVE AND STEM SEALING ASSEMBLY

CROSS-REFERENCE TO RELATED APPLICATION

Not Applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present disclosure relates to devices, for regulating flow of a fluid through a passage, either by closing the passage or restricting it by a definite predetermined motion of the flow-element, and more particularly to a plug valve wherein the valve stem and/or actuator is associated with means to pack or seal it to prevent leakage of fluid between the inside and outside of the valve body.

2. Description of Related Art

Plug valves are mechanical devices that are frequently utilized to regulate the flow of fluids such as liquids, gases and slurries over a wide range of temperatures and pressures. These valves are used in a variety of applications, particularly industrial applications (e.g. refining, chemical, petrochemical, pharmaceutical, etc.) Plug valves may be operated manually by hand or operated mechanically with pneumatic, hydraulic, or electric actuators.

Most valves, including plug valves, are generally provided with a passage containing a flow-element that is positioned within the passage. The flow-element regulates the fluid flow through the passage either by closing the passage or restricting it by a definite predetermined motion of the flow-element. The flow-element has an open position, which allows the fluid to flow through the passage, and a closed position that prevents the fluid from flowing through the passage. The flow-element is typically connected to a stem, which actuates the flow-element, either manually or mechanically, between the open position and closed position. The flow-element for a plug valve is typically a cylindrical or conically-tapered plug, which may be rotated inside the valve body to control flow through the valve. The flow-element has one or more hollow passageways extending through it. When the flow-element is in the open position, the passageway is substantially aligned with the passage thereby enabling a fluid to pass through the passage when it is in the open position.

Plug valves may also be provided with a bonnet, which is fastened to the body of the valve to secure the flow element and stem/plug in place as well as any sealing or packing. However, over time a valve stem/plug may be frequently moved between the open position and closed position, which may expose the bonnet to rotational stress thereby loosening the bonnet. This can cause the fluid to leak from the valve, which is very undesirable because it can undermine the ability of the valve to control and isolate flow, which can lead to increased maintenance time and costly process downtime. Moreover, in recent years, environmental regulations have placed a greater emphasis on reducing leaks and other fugitive emissions from valves in industrial settings by imposing fines and other penalties on facilities that exceed allowable levels making any fluid leakage undesirable.

In light of the foregoing, various solutions have been proposed to prevent plug valve stem and bonnet leakage between the inside and outside of the valve. One such solution is a conventional sealing system that utilizes a stem seal secured into position around the valve stem using fasteners such as bolts. Although this system can prevent leakage around the plug valve, it also presents problems of its own. In particular, as a result of exposure to demanding environmental and operating conditions, the integrity of the seal can become reduced over time and make the seals prone to leakage.

For example, valves may be exposed to wide and rapid temperature changes, i.e. thermal cycling, causing its seals to contract and expand rapidly, which may degrade the seal over time and impact the reliability of the valve. In addition, the reliability of a valve seal may be impacted by vibrations and rotational forces. For example, during operations, a stem seal is often exposed to rotational forces as a valve is moved between its open and closed position, which can degrade the integrity of the seal. Additionally, valves are often exposed to high pressure operating conditions and pressure drops, which cause vibrations that may degrade the seal, Once the seal begins to degrade, fluid often begins to leak from the inside to the outside of the valve. The valve must typically be removed from service for repair in order to prevent further leakage, which leads to costly process downtime and maintenance. One available option to prevent further leakage is to further tighten the adjustment bolts to secure the plug seal into place. However, this option requires intervention from operations personnel. Moreover, the additional force required to tighten the bonnet bolts can damage the valve, its components and significantly increase the valve operating torque.

Accordingly, in light of the foregoing, a need exists for an improved and more robust plug valve and stem sealing assembly capable of preventing leakage under demanding environmental and operating conditions while also improving the reliability of the valve seal and reducing maintenance needs.

BRIEF SUMMARY OF THE INVENTION

An object of this invention is to provide an improved and more robust plug valve and stem sealing assembly capable of preventing leakage under demanding environmental and operating conditions. Another object of this invention is to provide plug valve and stem sealing assembly that improves the reliability of the valve seal. Still a further object of this invention is to provide a plug valve and stem sealing assembly that reduces maintenance needs. Additional objects and advantages of this invention shall become apparent in the ensuing descriptions of the invention.

Accordingly, an improved and more robust plug valve and stem sealing assembly capable of preventing leakage under demanding environmental and operating conditions while also improving the reliability of the valve seal. The valve includes a body, a flow-element, a bonnet and a dynamic self-adjusting stem sealing assembly. The body has a first port and a second port with a passage configured to flow a media extending between said first port and said second port. The flow-element is positioned between the first and second port and has a stem configured to actuate the flow-element between a closed position and an open position. The bonnet may be secured to the valve body and configured to secure the flow-element and stem sealing assembly in position. The self-adjusting stem sealing assembly is positioned adjacent to the stem and is configured to prevent media leakage from the valve.

The foregoing brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the foregoing has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE SEVERAL VIEWS OF THE DRAWINGS

The accompanying drawings illustrate various embodiments of this invention. However, it is to be understood that these embodiments are not intended to be exhaustive, nor limiting of the invention. These embodiments are but examples of some of the forms in which the invention may be practiced.

DETAILED DESCRIPTION OF THE INVENTION

Figure 1A:
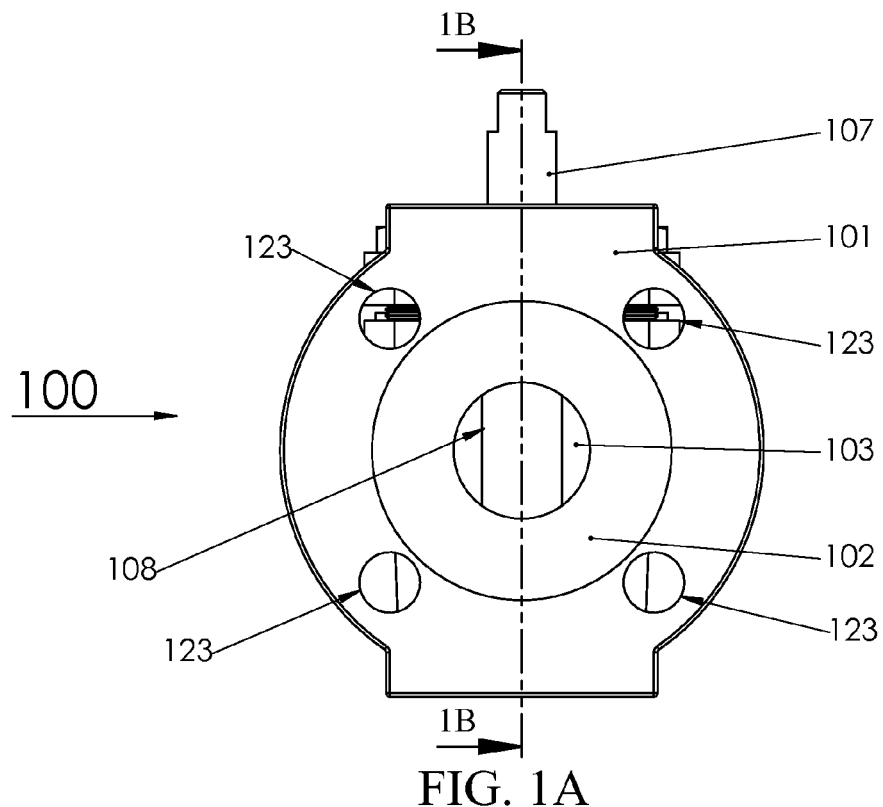
FIG. 1A is a side view of an embodiment of a valve in accordance with this invention.
Figure 1B:
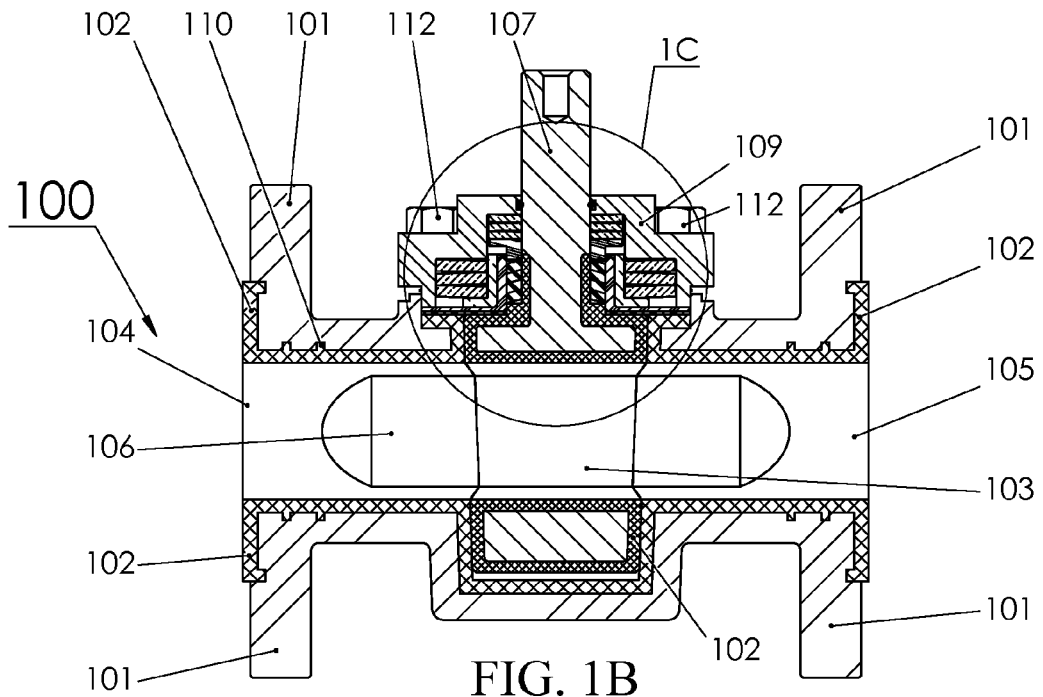
FIG. 1B is a cross-sectional view of the embodiment of the valve shown in FIG. 1A.
Figure 1C:
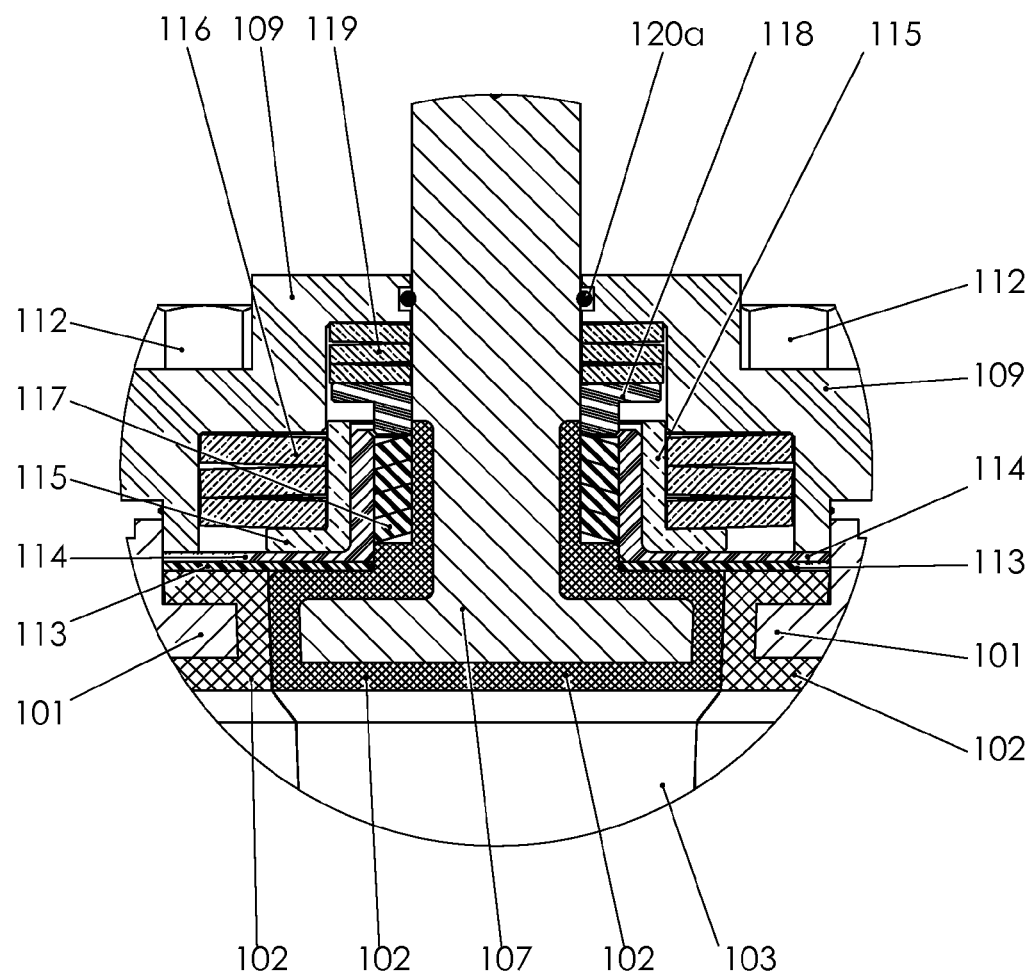
FIG. 1C is a close-up detail view of the embodiment of the valve shown in FIG. 1B.
Figure 1D:
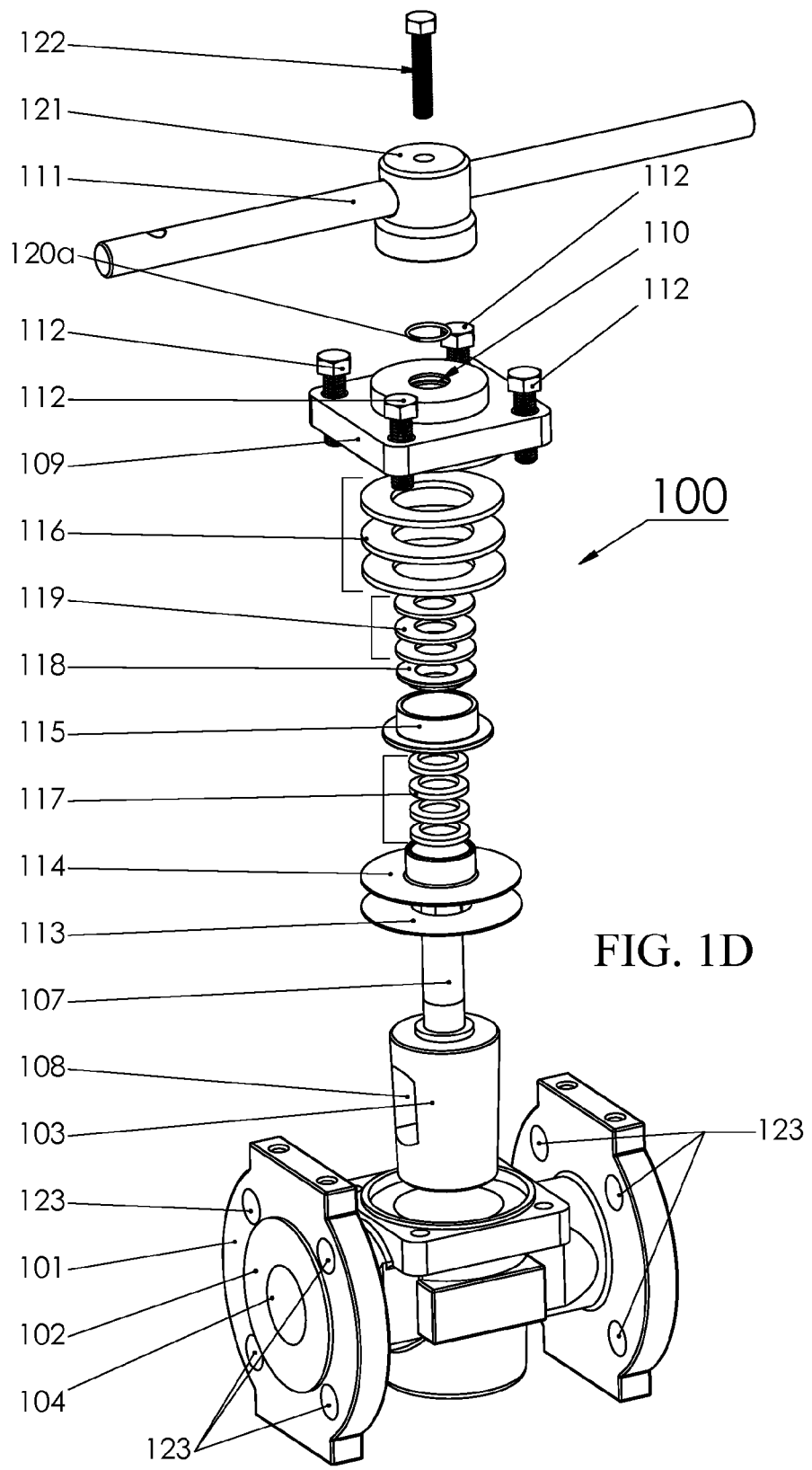
FIG. 1D is an exploded view of the stem sealing assembly shown in FIGS. 1A-1C.

The claimed subject matter is now described with reference to the drawings, wherein like reference numerals are used to refer to like elements throughout. An embodiment of a valve in accordance with this invention is shown generally in FIGS. 1A-1D at 100.

With reference initially to FIGS. 1A-1D, the valve (100) comprises a body (101), a flow-element (103) and a stem sealing assembly. The body (101) has a first port (104) and a second port (105) with a passage (106) configured to flow a media (e.g. liquid, gas, vapor, slurry, and so forth) extending between the first port (104) and the second port (105). The body (101) may be single body, three piece body, split body, top entry, or welded. The body (101) may also include a fastening connection (123), such as a flanged bolted connection or threaded connection, at its ends to secure the valve (100) to piping or other equipment. As one of ordinary skill in the art appreciates, the body (101) material may be selected based on the application of the valve (100). Examples of suitable materials include, but are not limited, to ductile cast iron, carbon steel, stainless steel, and so forth. The body (101) may also be coated with an epoxy paint to prevent external corrosion.

Although the valve (100) as shown in FIGS. 1A-1D has two ports, the body (101) can have more than two ports. For example, the valve (100) can have three ports (3-way valve) where media flow from one port could be directed to either the second or third port. The 3-way valve could also be designed to shift flow between the first port and the second port, the second port and the third port, or the first port and the third port, and possibly even connect all three ports together.

The flow-element (103) is positioned between the first port (104) and the second port (105). The flow-element (103) may have a stem (107) configured to actuate the flow-element (103), either manually or mechanically, between a closed position and an open position to control flow through the valve (100). The flow-element (103) may be a separate piece connected to the stem (107). Alternatively, to eliminate hysteresis and prevent lining damage associated with traditional two-piece designs, the flow-element (103) and stem (107) may be fabricated as a single unitary piece. The stem (107) may be operatively connected to an actuator (111). As shown in FIG. 3, the actuator (111) may be a manually actuated handle or lever; however, the actuator (111) may also be any conventional actuating means such as pneumatic actuators, hydraulic actuators, electric actuators, and so forth. The actuator (111) may be connected to the steam by a fastener such as a bolt, threaded connection and so forth.

The flow-element (103) is also configured to tightly fit against the body wall of the valve (100) to prevent leakage around the flow-element within the valve. The flow-element (103) may be a cylindrical or conically-tapered plug. The flow-element (103) also has one or more hollow passageways (108) extending through it. As shown in FIG. 1A, when the flow-element (103) is in the open position, the one or more hollow passageways (108) are substantially aligned with the passage (106) thereby enabling media to flow through the passage (106). The flow-element (103) material may be selected based on the application of the valve (100). Examples of suitable materials include, but are not limited, to ductile cast iron, carbon steel, stainless steel, and so forth.

The valve (100) further comprises a bonnet (109). The bonnet (109) can serve as a cover for the valve and may be secured to the body of the valve (100). The bonnet (109) is configured to secure the flow-element (103) and sealing assembly into position. The bonnet may also include a stem port (110). The stem (107) may extend through the stem port (110). The bonnet (109) is typically constructed from the same material as the body (101). The bonnet (109) may be secured to the body (101) by fasteners (112) such as bolts or any suitable conventional fastening means known to one of ordinary skill in the art such as a threaded connection, welded joint, and so forth.

The valve (100) may also include an internal liner (102) to prevent corrosion. The liner (102) is preferably substantially uniformly thick and secured to the surface of the valve (100). The liner (102) may be secured to any surface of the valve (100), but is preferably secured to any surface that will likely be exposed to the media. For example, a liner (102) may be secured to the surfaces of the body (101) that define the passage (106). The liner (102) may also be secured to the surfaces of the flow-element (103), and/or its stem (107).

The liner (102) may be secured to the valve (100) by any conventional means. For example, the liner (102) may be secured to the body (101) or flow-element (103) by a series of dovetail groves and interlocking anchor holes (110) on the body (101) of the valve, flow-element (103) and/or flow-element stem (107), which facilitate the handling of process pressure, vacuum, thermal cycling, and temperature cycling. As one of ordinary skill in the art appreciates, the liner (102) material may be selected based on the application of the valve (100). For example, in corrosive applications (e.g. chlorine, hydrochloric acid, and so forth), the liner (102) may be constructed from fluoropolymer materials such as fluorinated ethylene propylene (FEP), perfluoroalkoxy (PFA), polyvinylidenefluoride (PVDF), and so forth.

As discussed above, the valve (100) also comprises a stem sealing assembly. The stem sealing assembly is a dynamic sealing system that has the advantages of being virtually maintenance free and requiring minimal adjustment in the field. The stem sealing assembly is located substantially adjacent to the stem (107) and configured to be dynamically self-adjusting and capable of preventing media leakage from the inside to the outside of the valve (100). The stem sealing assembly surrounds the stem (107). In one embodiment, the stem sealing assembly may be positioned within an annular space defined by the area between the stem (107), bonnet (109) and body (101) when the valve (100) is assembled.

The stem sealing assembly comprises a primary seal and a secondary seal. The primary seal is configured to prevent media leakage from the interface between the flow-element (107) and body (101) of the valve. The primary seal comprises a primary sealing component. In a preferred embodiment, the primary sealing component may include a bottom sealing element (113) seated at the bottom of the annular space and on top of the interface between the body (101) and the flow-element (107). The bottom sealing element (113) should surround the flow-element stem (107) and may be in the shape of an annular ring or disc. If the body (101) and/or flow-element (107) are provided with a liner (102), then the bottom sealing element (113) may be located on top of their respective liners (102).

The bottom sealing element (113) material may be selected based on the application of the valve. Examples of suitable materials include, but are not limited, fluoropolymers and thermoplastic materials such as polytetrafluoroethylene (PTFE), and so forth. Examples of a suitable bottom sealing elements (113) include, but are not limited to, diaphragms, and so forth.

The primary sealing component may also include a top sealing element (114) seated in the annular space and positioned on top of the bottom sealing element (113). The top sealing (114) element may have a bottom portion that is disc shaped with a collar extending from it. The collar is substantially orthogonal to the bottom portion and configured to encompass the flow-element stem (107) and form an annular cavity between the collar of the top sealing element (114) and the flow element stem (107).

The top sealing element (114) material may be selected based on the application of the valve. Examples of suitable materials include, but are not limited, fluoropolymers and thermoplastic materials such as polytetrafluoroethylene (PTFE), and so forth. Examples of a suitable top sealing element (114) include, but are not limited to, diaphragms, and so forth.

The primary seal also has a primary force transmitting component seated in the annular space on top of the top sealing element (114). The primary force transmitting component is configured to be self-adjusting and capable of dynamically compensating for wear or wobble due to misalignment experienced by the primary sealing component. The primary force transmitting component comprises a primary force transmitting surface (115) and a primary force transmitting member (116) that is configured to transfer an axial load to the force transmitting surface (115). The primary force transmitting member (116) provides a constant seating force to the primary sealing component.

In a preferred embodiment, the primary force transmitting member (116) may provide a constant seating force to the top sealing element (114) and bottom sealing element (113). The primary force transmitting surface (115) may have a bottom portion that is shaped like a disc with a collar extending from the bottom portion, which is substantially orthogonal to the bottom portion. The force transmitting surface (115) encircles the collar of the top sealing element (114) and is configured to form a substantially tight seal with the top sealing element (114) thereby reducing or eliminating media leakage from the inside to the outside of the valve (100).

The primary force transmitting surface (115) material may be selected based on the application of the valve. Examples of suitable materials include, but are not limited, stainless steel, and so forth. Examples of suitable primary force transmitting surfaces (115) include, but are not limited to, pushers, and so forth.

The primary force transmitting member (116) should be seated between the primary force transmitting surface (115) and a force loading element. The force transmitting member (116) may be seated on the disc shaped bottom portion of the force transmitting surface (115). The force transmitted by the primary force transmitting member (116) is generally dependent upon the area of flow through the valve (100). The primary force transmitting member (116) should be capable of transmitting a sufficient force to create a reliable seal.

In an embodiment, the primary force transmitting member (116) may be one or more Belleville springs. However, as one of ordinary skill in the art appreciates, other primary force transmitting members may also be utilized. Examples of other suitable primary force transmitting members include, but are not limited to, helical coil springs, wave springs and so forth. The primary force transmitting member (116) material may be selected based on the application of the valve. Examples of suitable materials include, but are not limited, stainless steel, and so forth.

The force loading element is configured to transfer a preload force to the primary force transmitting member (116). In an embodiment, the force loading element may be the bonnet (109). In order to secure the bonnet (109) to the body (101) of the valve (100), torque is applied to tighten the fasteners that secure the bonnet (109) to the body (101) of the valve. The torque applied to the fasteners creates a clamp load or preload force that is then transferred to the force loading element which loads the primary force transmitting member (116).

The secondary seal should have a diameter less than that of the primary seal. The secondary seal comprises packing (117) that is configured to fit in the annular cavity between the collar of the top sealing element (114) and the flow element stem (107). The packing (117) is configured to expand radially and axially when subjected to an axial load thereby filling any voids caused by loose tolerances, fit and wear as well as forming a substantially tight seal with the top sealing element (114) and flow element stem (107), which reduces or substantially eliminates media leakage from the inside to the outside of the valve. In the case the flow element stem (107) has a liner (102), the packing (117) will form a substantially tight seal with the top sealing element (114) and the flow element stem (107) and/or its liner (102). In an embodiment, the packing (117) may be annular or disc shaped and surround the flow-element stem (107). The packing (117) material may be selected based on the application of the valve. Examples of suitable materials include, but are not limited, fluoropolymers elastomers, orings and materials such as polytetrafluoroethylene (PTFE), and so forth.

The secondary seal further comprises a secondary force transmitting component seated in the annular space on to of the packing (117). The secondary force transmitting component is configured to be self-adjusting and capable of dynamically compensating for cold flow, wear or wobble due to misalignment experienced by packing (117), top sealing element (114) and/or bottom sealing element (113). The secondary force transmitting component comprises a secondary force transmitting surface (118) and a secondary force transmitting member (119) that is configured to transfer an axial load to the force transmitting surface (118). The secondary force transmitting member (119) provides a constant seating force to the packing (117). The secondary force transmitting surface (118) should have a bottom portion that is shaped like a disc with a collar extending from the bottom portion, which is substantially orthogonal to the bottom portion. The secondary force transmitting surface (118) encircles the flow-element stem (107). In an embodiment, the collar of the secondary force transmitting surface (118) may be configured to transfer an axial load to the packing (117) by substantially aligning the collar with the packing (117).

The secondary force transmitting member (119) should be seated between the secondary force transmitting surface (118) and a force loading element. The secondary force transmitting member (119) may be seated on the disc shaped bottom portion of the secondary force transmitting surface (119). The force transmitted by the secondary force transmitting member (119) is typically generally dependent upon the area of flow through the valve (100). The secondary force transmitting member (116) should be capable of transmitting sufficient force to create a reliable seal In an embodiment, the secondary force transmitting member (119) may be one or more Belleville springs. However, as one of ordinary skill in the art appreciates, other secondary force transmitting members may also be utilized. Examples of other suitable secondary force transmitting members include, but are not limited to, helical coil springs, wave springs and so forth. The secondary force transmitting member (119) material may be selected based on the application of the valve. Examples of suitable materials include, but are not limited, stainless steel, and so forth.

The force loading element should be configured to transfer a preload force to the secondary force transmitting member (119). In an embodiment, the force loading element may be same as the first loading element for the primary force transmitting member (116), i.e. the bonnet (109). In order to secure the bonnet (109) to the body (101) of the valve, torque is applied to tighten the fasteners that secure the bonnet (109) to the body (101) of the valve. The torque applied to the fasteners creates a clamp load or preload force that is then transferred to the force loading element which loads the secondary force transmitting member (119).

The bonnet (109) may also have a ring-shaped groove in the stem port (110) configured to receive a tertiary sealing element (120a). The tertiary sealing element (120a) is configured to prevent or substantially eliminate any atmospheric media from entering the primary and secondary seals. The tertiary sealing element (120a) may also serve as bearing between the stem (107) and bonnet (109) and assist with reducing lateral forces that may be placed on the flow-element (103) and stem (107).

An alternative embodiment of a valve in accordance with this invention is also illustrated generally in FIGS. 2A-2D at 200. In this embodiment, the primary force transmitting member (116) and the secondary force transmitting member (119) may be loaded by different force loading elements. For example, in an embodiment, the bonnet (109) may be configured to have a primary force loading element and a secondary force loading element. Both the primary and secondary force loading elements are configured to transfer a preload force to their respective force loading members. The primary force loading element may be the outer body of the bonnet (124). The outer body of the bonnet (124) may be provided fasteners to secure it to the body (101) of the valve. As torque is applied to the fasteners to secure the outer body of the bonnet (124) to the body (101), a preload force or clamp load is created that is then transferred to the primary force loading element which loads the primary force transmitting member (116).

Figure 2A:
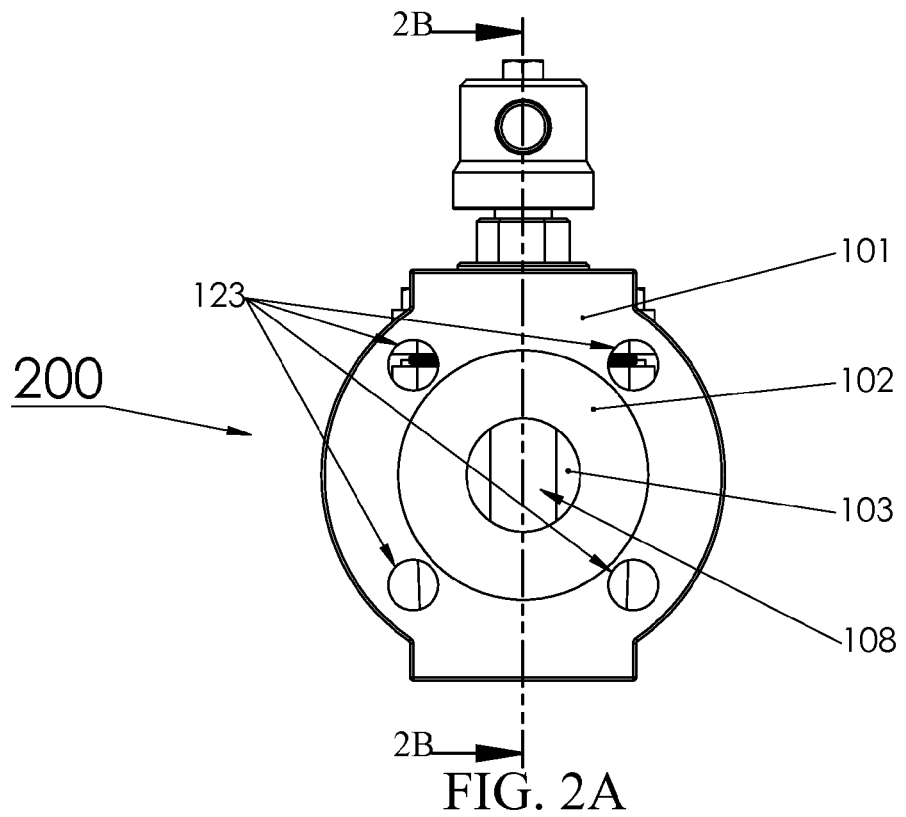
FIG. 2A is a side view of an alternate embodiment of a valve in accordance with this invention.
Figure 2B:
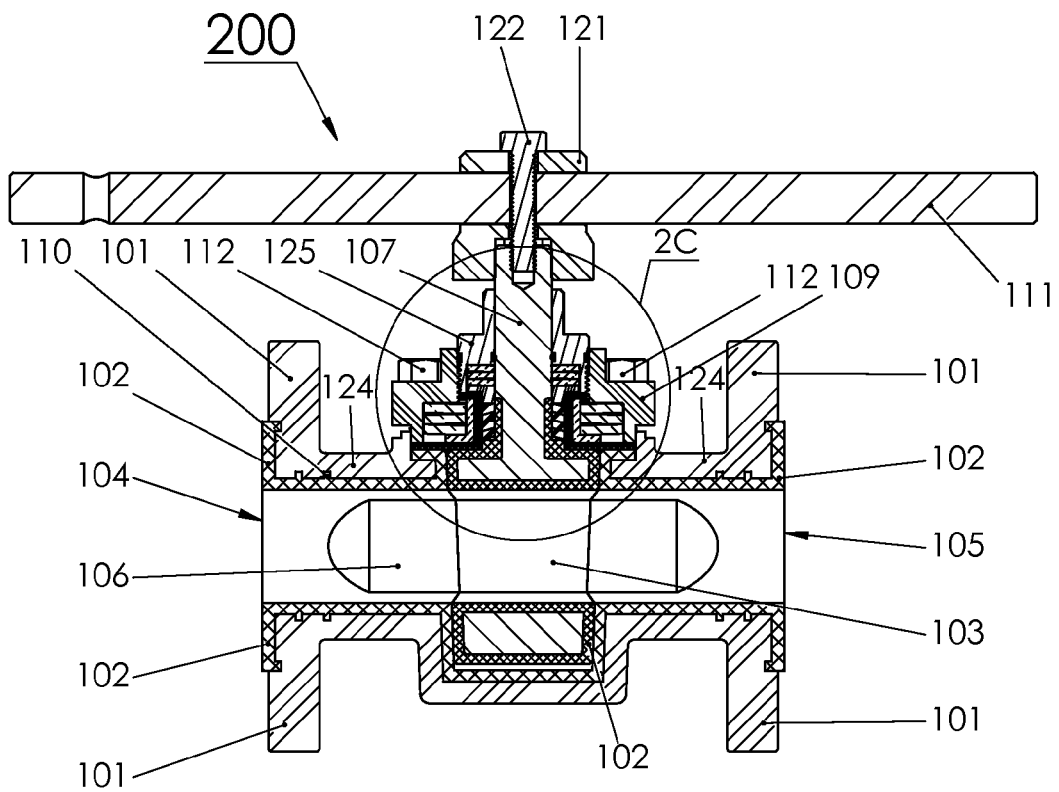
FIG. 2B is a cross-sectional view of the embodiment of the valve shown in FIG. 2A.
Figure 2C:
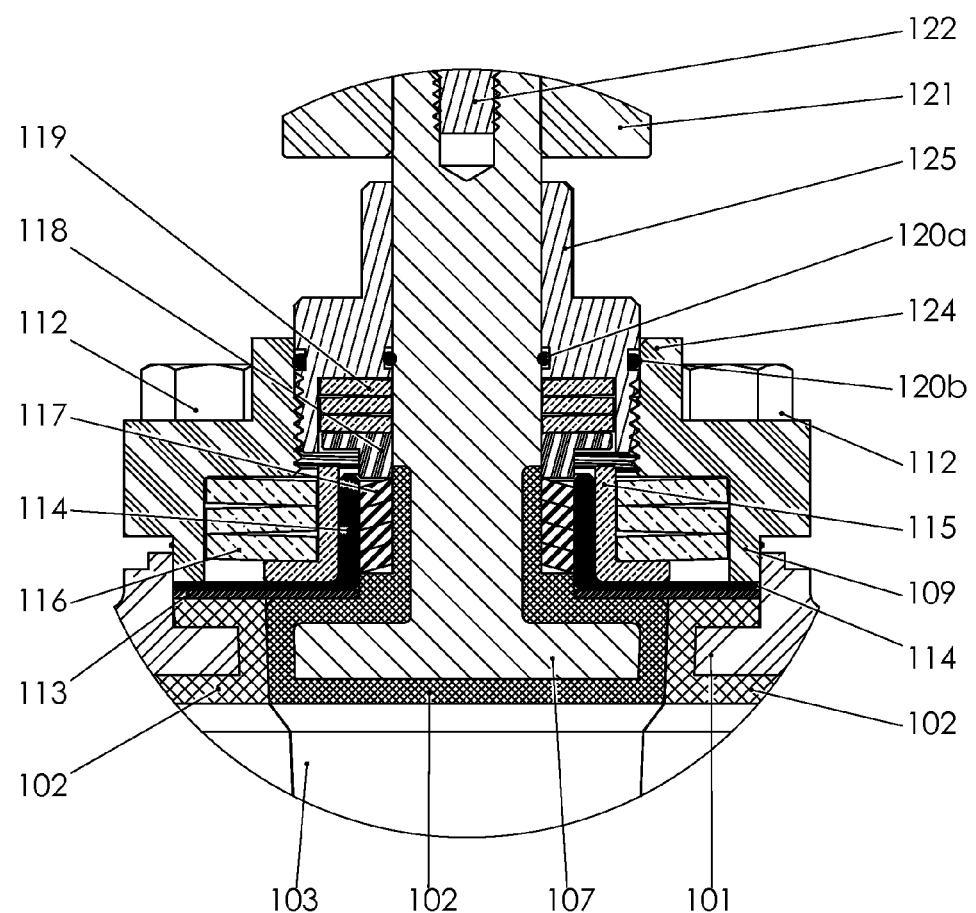
FIG. 2C is a close-up detail view of the embodiment of the valve shown in FIG. 2B.
Figure 2D:
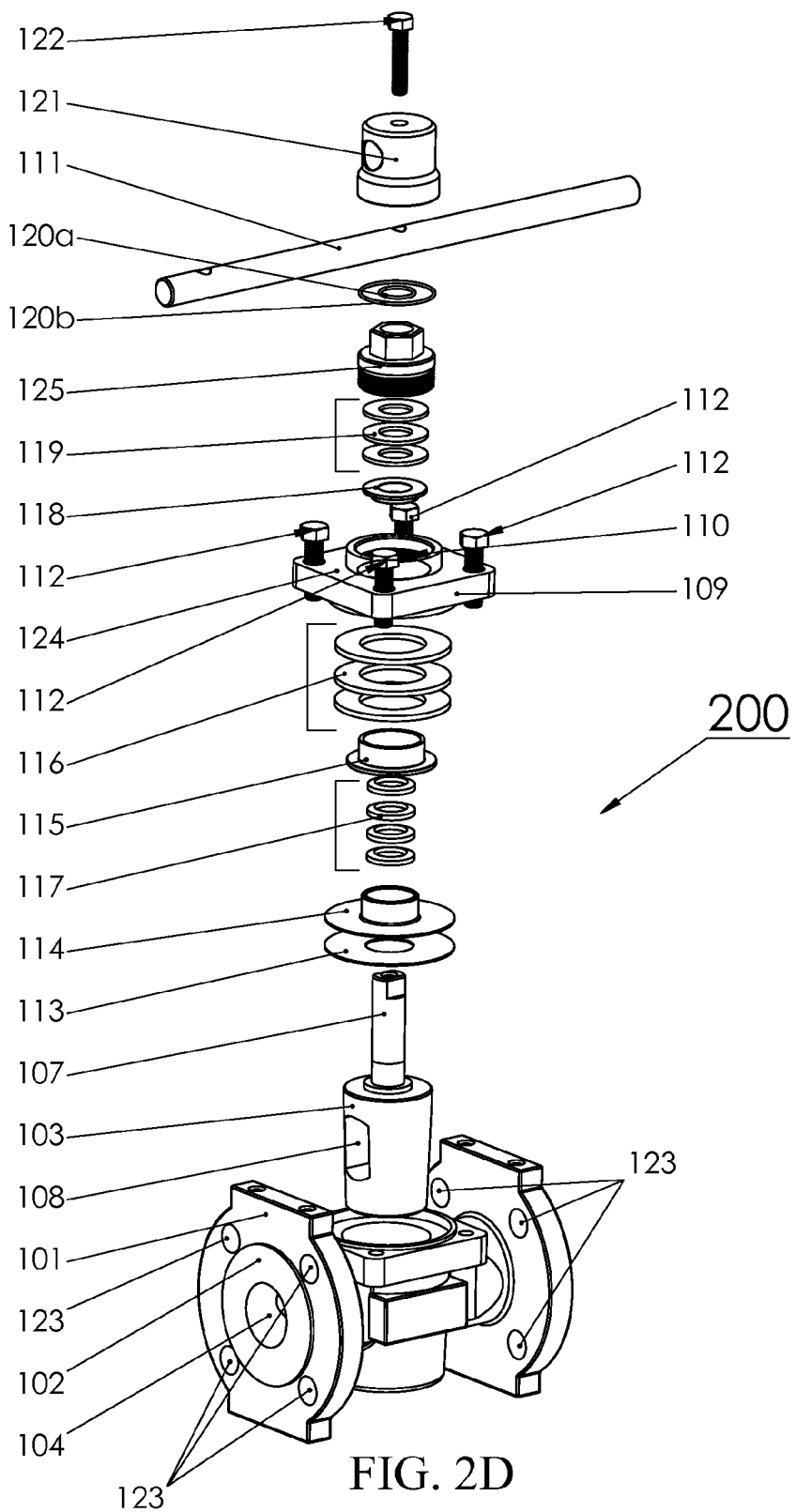
FIG. 2D is an exploded view of the stem sealing assembly shown in FIGS. 2A-2C.

The secondary force loading element may be the inner body of the bonnet (125). The inner body of the bonnet (125) may be secured to the outer body of the bonnet (124) by a threaded connection as shown in FIGS. 2A-2C. Alternatively, the inner body of the bonnet (125) may be secured to the outer body of the bonnet (124) by any conventional fastening means such as a bolted connection and so forth. As the inner body (125) is tightened to secure it to the outer body (124), the torque creates a preload or clamp force that is transferred to the secondary loading element which loads the secondary force transmitting member (119).

In the alternative embodiment, the inner (125) and/or outer (124) body of the bonnet may have ring-shaped grooves configured to receive a tertiary sealing element (120a, 120b). The tertiary sealing element (120a, 120b) is configured to prevent or substantially eliminate any atmospheric media leakage from entering the primary and secondary seals and is also configured to serve as a bearing between the stem (107) and inner body of the bonnet (125) as well as between the inner (125) and outer body (124) of the bonnet. The sealing element (120a, 120b) may also assist with reducing lateral forces that may be placed on the flow-element (103) and stem (107). Examples of a suitable tertiary element include, but are not limited to, o-rings, and so forth.

In operation, during assembly of the valve, the flow-element (103) is seated within the passage (106) of the body (101) of the valve between the first port (104) and the second port (105). The flow-element (103) fits into a corresponding groove in body of the valve and fits tightly against the body wall of the valve to prevent leakage around the flow-element (103) within the valve.

Once the flow-element (103) is seated in the valve, the sealing assembly is arranged around the stem (107) to prevent or substantially eliminate media leakage from the interface between the flow-element (107) and body (101) of the valve. The bottom sealing element (113) is seated at the bottom of the annular space defined by the area between the stem (107), bonnet (109) and body (101). The bottom sealing element is seated on top of the interface between the body (101) and the flow-element (107). The top sealing element (114) is seated in the annular space on top of the bottom sealing element (113) and surrounds the flow-element stem (107). Packing (117) is seated in the annular cavity between the collar of the top sealing element (114) and the flow element stem (107). The primary force transmitting surface (115) is placed on top of the top sealing element (114). The secondary force transmitting surface (118) is placed on top of the packing (117) so that the collar of the secondary force transmitting surface (118) is substantially aligned with the packing (117). The secondary force transmitting member is seated on top of the secondary force transmitting surface (118) and the primary force transmitting member (116) is seated on top of the primary force transmitting surface (115).

Once the sealing assembly is seated around the stem, the bonnet (109) is secured to the body (101) of the valve using fasteners (112). As the fasteners are tightened secure the bonnet (109) to the body (101) of the valve, the torque applied to the fasteners creates a clamp or preload force that is then transferred to the force loading element which loads the primary (116) and secondary (119) force transmitting members. The primary force transmitting member (116) transfers the preload force to the primary force transmitting surface (115) which transfers the axial load to the primary seal thereby forming a seal between the primary seal and the interface between the flow-element (107) and body (101) of the valve and preventing media leakage from the inside to the outside of the valve. The secondary force transmitting member (119) transfers the preload force to the secondary force transmitting surface (118) thereby transmitting an axial load to the packing (117). As the packing (117) is subjected to the axial load, it expands radially and axially thereby filling any voids caused by loose tolerances, fit and/or wear and forms a substantially tight seal with the top sealing element (114) and flow element stem (107), which reduces or substantially eliminates media leakage from the inside to the outside of the valve. The tertiary sealing element (120a) is placed in the stem port (110) of the bonnet (109) to act as a bearing between the stem (107) and bonnet (109) and assist with reducing lateral forces that may be placed on the flow-element (103) and stem (107). The actuator (111) is then secured to the bonnet by a fastener (122).

If the valve is provided with a bonnet having both a primary force loading element and a secondary force loading element as described above, the valve is assembled in the same manner as described above. However, in this embodiment, the primary force transmitting member (116) is loaded by the outer body of the bonnet (124) and the secondary force transmitting member is loaded by the inner body of the bonnet (125). As torque is applied to the fasteners to secure the outer body of the bonnet (124) to the body (101), a preload force or clamp load is created that is then transferred to the primary force loading element which loads the primary force transmitting member (116). As the inner body (125) is tightened to the outer body (124), the torque creates a preload or clamp force that is transferred to the secondary loading element which loads the secondary force transmitting member (119).

Over time, the bottom (113) or top (114) sealing element of the primary seal and/or the packing (117) of the secondary seal may experience wear due to operating conditions. This wear and tear may create voids in the interface between the primary seal, flow-element (103) and/or flow-element stem (107), and the body (101) of the valve. Similarly, wear and tear experienced by the packing (117) may also create voids between the secondary seal and the flow-element (103) and/or flow-element stem (107). These voids may eventually create flow paths that allow media to pass from the inside to the outside of the valve.

The stem sealing assembly in accordance with this invention has the advantage of preventing the formation of the aforementioned flow paths by providing dynamic forces that are capable of continuously adjusting. For example, if the top (114) and/or bottom (113) sealing element begins to experience wear or cold flow, the primary force transmitting member (116) will automatically extend thereby substantially sealing any voids between the top (114) and/or bottom (113) sealing element and the valve. Similarly, if the packing begins to experience wear, the secondary force transmitting member (119) will automatically extend and cause the packing (117) to further expand axially and/or radially thereby sealing any voids. In addition, the force loading element may be further tightened to create a greater clamp or preload force to enact a tighter seal between the seal assembly and its interface point(s) with the valve.

Any reference to patents, documents and other writings contained herein shall not be construed as an admission as to their status with respect to being or not being prior art. Although the present invention and its advantages have been described in detail, it is understood that the array of features and embodiments taught herein may be combined and rearranged in a large number of additional combinations not directly disclosed, as will be apparent to one having ordinary skill in the art.

Moreover, it should be understood that various changes, substitutions and alterations can be made herein without departing from the spirit and scope of the invention as defined by the following claims. There are, of course, other alternate embodiments, which are obvious from the foregoing descriptions of the invention, which are intended to be included within the scope of the invention, as defined by the following claims.

What is claimed is:
1. A valve comprising:
 a. a body having a first port and a second port with a passage configured to flow a media extending between said first port and said second port;
 b. a flow-element positioned between said first port and said second port, wherein said flow-element has a stem configured to actuate said flow-element between a closed position and an open position;
 c. a self-adjusting stem sealing assembly adjacent to said stem and configured to prevent media leakage from the valve, wherein said stem sealing assembly comprises:
  i. a primary seal seated in an annular space defined by the area between said stem, said body and said bonnet, said primary seal comprising:
   a bottom sealing element;
   a top sealing element,
   a primary force transmitting surface; and
   a primary force transmitting member configured to transfer a first axial load to said primary force transmitting surface, wherein said primary force transmitting surface is configured to transfer said first axial load to said bottom sealing element and said top sealing element to create a seal between said body and said stem;
  ii. a secondary seal comprising:
   a packing configured to expand radially to form a seal with said stem:
   a secondary force transmitting surface; and a secondary force transmitting member configured to transfer a second axial load to said secondary force transmitting surface, wherein said secondary force transmitting surface is configured to transfer said second axial load to said packing thereby creating a seal between said stem and said primary seal;
iii. a tertiary seal; and
d. a bonnet secured to said body and configured to secure said flow-element and stem sealing assembly into position.

2. The valve of claim 1, wherein said bottom sealing element is seated at the bottom of the annular space defined by the area between said stem, said body and said bonnet.

3. The valve of claim 1, wherein said top sealing element is seated within the annular space and positioned on top of said bottom sealing element.

4. The valve of claim 1, wherein said packing is configured to fit within an annular cavity defined by the area between said top sealing element and said stem.

5. The valve of claim 1, wherein said bonnet is configured to act as a force loading element and transfer a preload force to the primary and secondary force transmitting members.

6. The valve of claim 1, wherein said tertiary seal is configured to substantially eliminate any atmospheric media from entering the primary and secondary seals.

7. The valve of claim 1, wherein said primary force transmitting member and secondary transmitting member are belleville springs.

8. The valve of claim 1, wherein said valve has a corrosion resistant liner secured to the surface of the valve and to the surface of the flow-element, wherein said liner is secured to the surface of said valve by a series of dovetail groves and interlocking holes.

9. The valve of claim 1, wherein said flow-element is a plug configured to regulate the media flow through said passage.

10. A self-adjusting stem seal assembly for a plug valve having a body with a first port, a second port and a passage configured to flow a media extending between said first port and said second port, a flow-element positioned between said first port and said second port, wherein said flow-element has a stem configured to actuate said flow-element between a closed position and an open position and a bonnet secured to said body, wherein said stem seal assembly is adjacent to said stem and is configured to prevent media leakage from the valve, said stem seal assembly comprising:
a. a primary seal seated in an annular space defined by the area between said stem, said body and said bonnet, said primary seal comprising:
i. a primary sealing component comprising;
a bottom sealing element:
a top sealing element,
ii. a primary force transmitting component, wherein said primary force transmitting component comprises a primary force transmitting surface and a primary force transmitting member configured to transfer a first axial load to said primary force transmitting surface, wherein said primary force transmitting surface is configured to transfer said first axial load to said bottom sealing element and said top sealing element to create a seal between the said body and said stem;
b. a secondary seal comprising:
i. a packing configured to expand radially to form a seal with said stem;
ii. a secondary force transmitting component, wherein said secondary force transmitting component comprises a secondary force transmitting surface; and a secondary force transmitting member configured to transfer a second axial load to said secondary force transmitting surface, wherein said secondary force transmitting surface is configured to transfer said second axial load to said packing thereby creating a seal between said stem and said primary seal; and
c. a tertiary seal.

11. The self-adjusting stem seal assembly of claim 10, wherein:
a. said bottom sealing element is seated at the bottom of the annular space defined by the area between said stem, said body and said bonnet; and,
b. said top sealing element is seated within the annular space and positioned on top of said bottom sealing element.

12. The self-adjusting stem seal assembly of claim 11, wherein said packing is configured to fit within an annular cavity defined by the area between said primary seal and said stem.

13. The self-adjusting stem seal assembly of claim 10, wherein said primary force transmitting member and secondary transmitting member are belleville springs.

14. The valve of claim 10, wherein said flow-element is a plug configured to regulate the media flow through said passage.

15. A plug valve comprising:
a. a body having a first port and a second port with a passage configured to flow a media extending between said first port and said second port;
b. a flow-element positioned between said first port and said second port, wherein said flow-element has a stem configured to actuate said flow-element between a closed position and an open position;
c. a stem sealing assembly configured to prevent media leakage from the valve, said stem sealing assembly comprising:
i. a primary seal comprising:
a bottom sealing element;
a top sealing element;
a primary force transmitting surface;
a primary force transmitting member configured to transfer a first axial load to said primary force transmitting surface, wherein said primary force transmitting surface is configured to transfer said first axial load to said bottom sealing element and said top sealing element to create a seal between said body and said stem;
ii. a secondary seal;
iii. a tertiary seal; and
d. a bonnet secured to said body.

16. The plug valve of claim 15 wherein said bonnet is configured to act as a force loading element to transfer a preload force to said stem sealing assembly.

17. The plug valve of claim 16 wherein said bonnet comprises:
a. a primary force loading element; and
b. a secondary force loading element.

18. The plug valve of claim 15, wherein said primary seal is configured to be self-adjusting and capable of dynamically compensating for wear.

19. The plug valve of claim 15, wherein said secondary seal is configured to be self-adjusting and capable of dynamically compensating for wear.

20. The plug valve of claim 15, wherein said secondary seal comprises:
a. a packing;
b. a secondary force transmitting surface; and c. a secondary force transmitting member configured to transfer a second axial load to said secondary force transmitting surface, wherein said secondary force transmitting surface is configured to transfer said second axial load to said packing.

\* \* \* \* \*